United States Patent Office 2,861,498
Patented Nov. 25, 1958

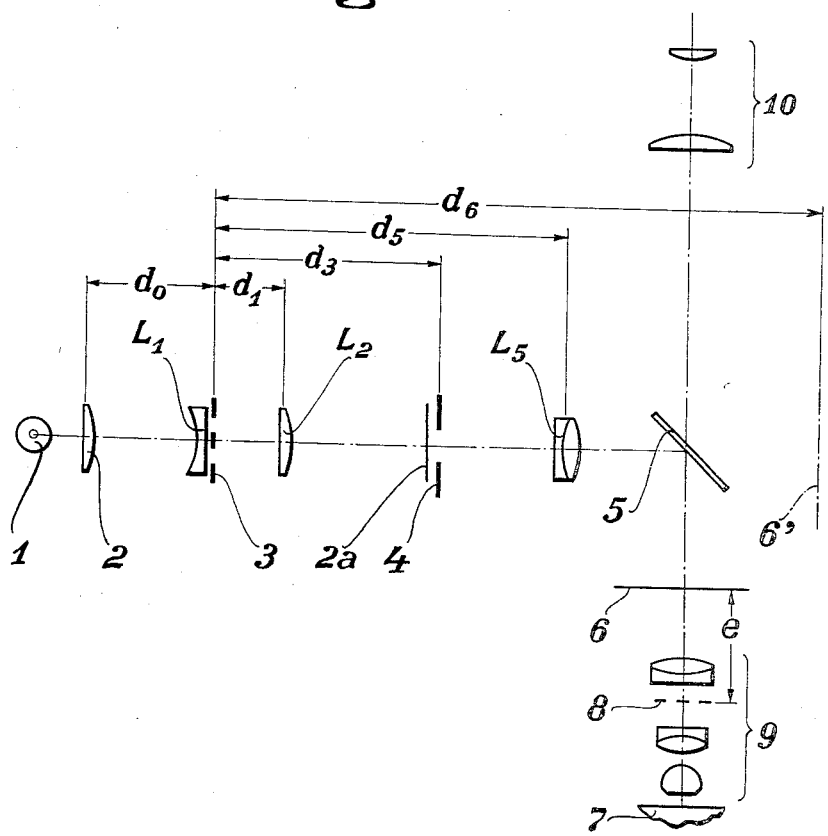

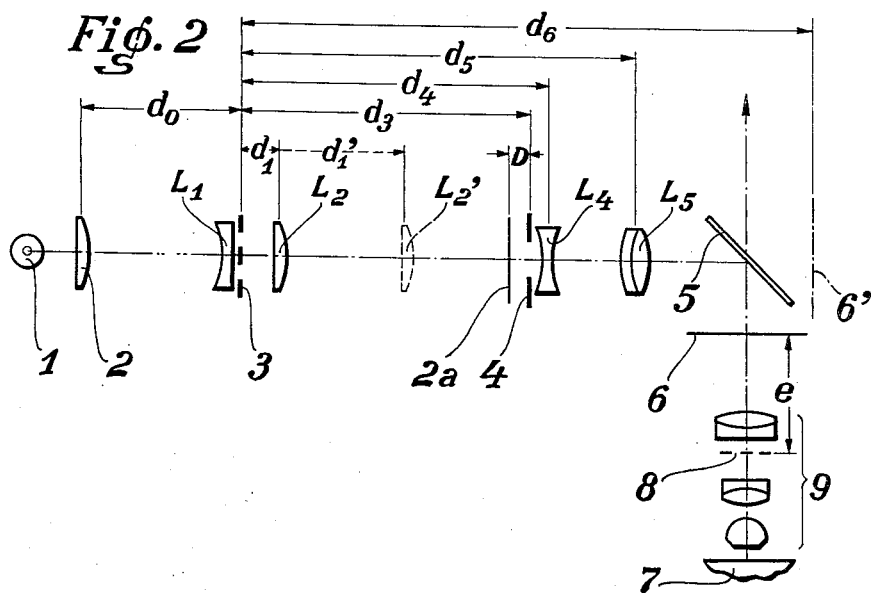

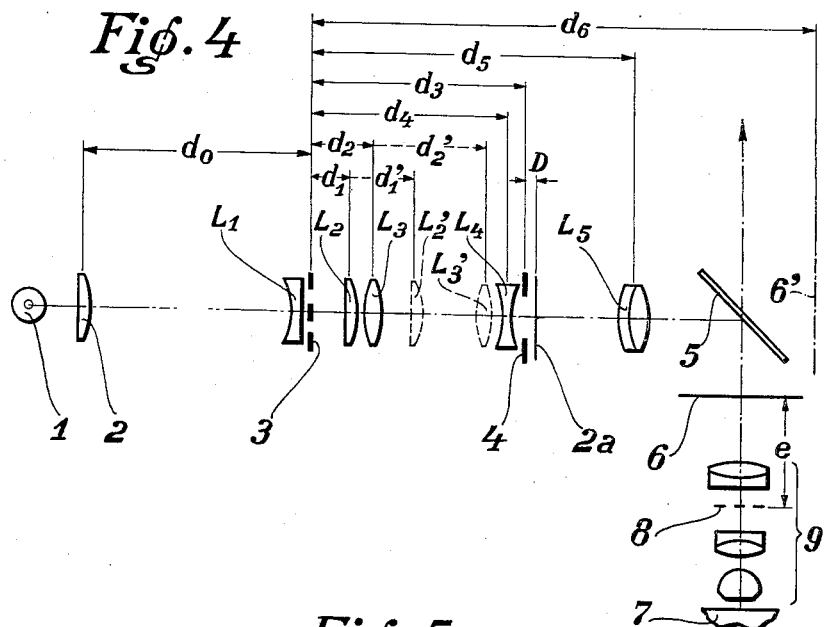
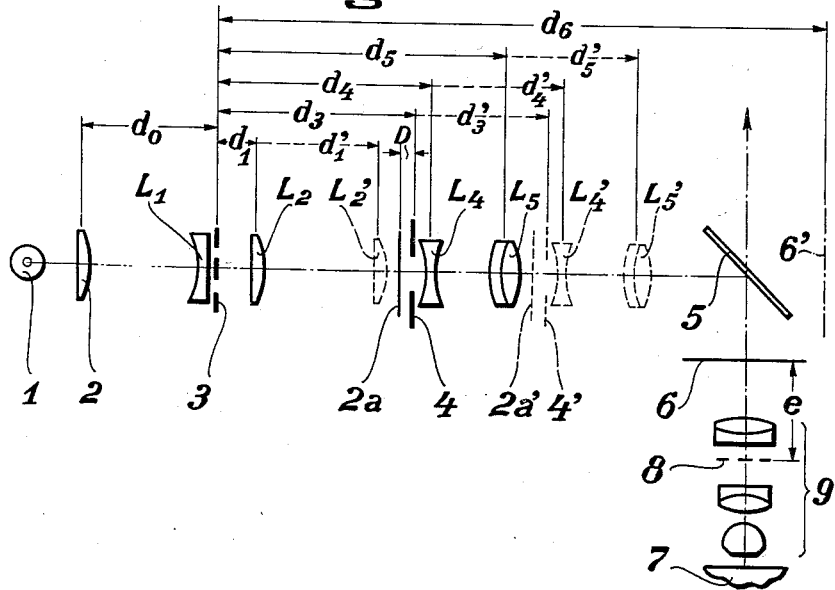

2,861,498

APPARATUS FOR KOEHLER ILLUMINATION OF PHASE CONTRAST TOP LIGHT MICROSCOPES

Walter Klein, Wissman, Germany, assignor to Ernst Leitz, G. m. b. H., Wetzlar, Germany, a corporation of Germany Application April 12, 1954, Serial No. 422,612

Claims priority, application Germany July 28, 1953

16 Claims. (Cl. 88—39)

My present invention relates to top illuminated microscopes, such, for example, as are used for metalographic purposes, using phase contrast.

In such microscopes according to Zernike there has been arranged in the back focal plane of the microscope an annular phase zone on which the illuminating light is projected as an image of an annular aperture which serves as angular aperture diaphragm. While, in bottom illumination with the light passing through the object, the aperture is mounted with a condenser, a specially mounted aperture must be employed for top illuminated microscopes to which my invention is directed in which the microscope objective itself serves as a condenser and in which case the back focal plane receives the image of the aperture. The back focal plane of a stronger objective lies nearer the object than that of a weaker objective. Since, moreover, the diameter of the annular phase zone is smaller for a stronger objective, it was necessary heretofore to construct the aperture in several sizes. This presented the problem of providing an illuminating apparatus according to the Koehler principle that was not only pancratic, that is, to provide one of variable enlargement, but also in such manner that the smaller image of the aperture stood at a greater distance from the aperture. According to the Koehler principle, the illuminating lamp was in a known manner projected by a collecting lens at the angular aperture diaphragm and, with further lenses, this diaphragm was projected as an image in the back focal plane of the objective. At the same time the collector lens was projected through one of the further or additional lenses as an image on field of view diaphragm which, in a top illuminated microscope, was then projected as an image onto the object through the objective as a condenser.

My invention, in one embodiment, provides, in microscopes of this type provided with a series of phase objectives, a lens slidable along its optical axis between the angular aperture diaphragm and the field of view diaphragm for imaging the angular aperture diaphragm onto the various phase plates of the objectives, which in shifting evolves variable images of the angular aperture diaphragm which are projected from the field of view diaphragm projecting lens as images in the focal plane of the different objectives. The imaging of the collector lens on the field of view diaphragm is, however, also altered by the shifting of this lens. In order to make this alteration as slight as possible, the collector lens is imaged on the field of view diaphragm in the proportion 1:1 while the optical distance between the shiftable lens and the collector lens is decreased by providing a negative field lens at the angular aperture diaphragm.

In order to obtain as nearly uniform illumination of the field of view diaphragm as is possible with a yet greater range of magnification, the lens which projects the field of view diaphragm onto the object is supplemented to a telesystem in a second embodiment of the invention, by the insertion of a negative system in the vicinity of the field of view diaphragm. This permits the slidable lens to be shifted somewhat beyond its focal length and thus increases its range of magnification. For this negative lens prevents a real intermediate image of the angular aperture diaphragm being formed in the vicinity of the field of view diaphragm projecting lens by a shifting of the slidable lens for a great distance.

In a third embodiment of the invention two oppositely slidable lenses are provided in place of the single slidable lens. In a fourth embodiment, a negative lens system is provided together with two lenses slidable in the same direction in the space between the two diaphragms. In a fifth embodiment only one slidable lens is in the space between the two diaphragms and the telesystem is slidable as a unit with the field of view diaphragm.

The arrangement of two slidable lenses acts to project the collector aperture more exactly to the position of the field of view diaphragm so that the same is uniformly illuminated. For with two slidable lenses this may always be attained if the rate of shifting of one lens is not linear with respect to the other. A good approximation is attained, however, if both lenses are made to be slidable at linear relative rates and at the same time the negative lens is so determined that the formation of the image is accomplished near the same place. Examples of the embodiments illustrated below show cases of such linear shifting but the examples of non-linear rates of shifting are not to be excluded from the scope of the invention.

If the shifting lens be shifted out of the position in which the exact imaging of the annular aperture of the angular aperture diaphragm takes place on the phase zone, a bright field illumination results instead of a phase contrast.

In the accompanying drawings the various embodiments are shown diagrammatically by way of example, the various mounting accessories being omitted for clarity of illustration as they may be of any suitable form known in the art. The distances of the various elements are also shown and are referred to in the correspondingly numbered tables that follow. In the drawings, Fig. 1 is a schematic diagram of the first-mentioned embodiment;

Fig. 2 is a similar diagram of the second embodiment;

Fig. 3 is a similar diagram of the third embodiment;

Fig. 4 is a similar diagram of the fourth embodiment; and

Fig. 5 is a similar diagram of the fifth embodiment.

Referring more particularly to Fig. 1, a beam of light from a lamp 1 is projected through a collector lens 2 to an annular aperture in an angular aperture diaphragm 3. The aperture is mounted on or at the plane face of a planoconcave or negative lens $L_1$ between the aperture diaphragm and the lens 2 and with the concave face toward the lens 2 and lamp 1. From the aperture the beam, now of annular cross section, passes through a lens $L_2$, shiftable on its optical axis, to the aperture of a field of view diaphragm 4. An image of the collector lens will be formed in the plane 2a.

The beam passing through the aperture of the field of view diaphragm passes through a lens $L_5$ to a beam splitter plate 5 of a semi-transparent mirror by which it is reflected to the objective lenses designated collectively as 9 and which are attached to the microscope tube at its lower face in the plane 6. The lenses $L_2$ and $L_5$ serve to form an image of the annular aperture of the diaphragm 3 at the position of the phase plate 8 in the exit pupil of the optical system comprising the microscope objective 9, the reflecting surface of the specimen or object 7 and an illuminating system, the exit pupil and phase plate for each objective being at different vertical positions from that of the other objectives where the image of the lens 2 is formed at 2a near the field of view diaphragm 4 and reproduced through the lens $L_5$ and the objective 9 in the plane of the object 7. The beam reflected from the object passes partly through the phase plate and partly beside it and through the beam splitter to the eye piece 10.

The various objectives of a series to be used are to be fastened to the microscope tube at the plane 6, the tube itself not being shown in the drawing. The several objectives have, however, individual and independent positions of back focal planes and accordingly of phase plates. The variable distance of the phase plate from the plane 6 is designated $e$. With objectives of greater focal length the back focal plane lies near the plane 6 and the exit pupil of the objective and, correspondingly, the phase plate is large so that a large light image must be projected to them, while this is the reverse for objectives of shorter focal length. These various images are attained, according to the invention, by shifting the lens $L_2$.

The embodiment shown in Fig. 2 comprises the same elements as that of Fig. 1 and these elements are therefore designated with the same reference characters. In this embodiment, there is also inserted a negative lens $L_4$ placed between the field of view diaphragm 4 and the lens $L_5$, lenses $L_4$ and $L_5$ forming a telesystem, in order to permit the slidable lens $L_2$ to be shifted further, as indicated in broken lines at $L_2'$.

In the embodiment shown in Fig. 3 the elements of Fig. 2 are embodied and are designated by the same reference characters but a lens $L_3$ is placed between the lens $L_2$ and the field of view diaphragm 4 and is slidably mounted to move reversely to the movement of the lens $L_2$ as indicated by the broken line positions $L_2'$ and $L_3'$.

In the embodiment of Fig. 4 the elements are the same as those of Fig. 3 and are similarly designated but the negative lens $L_4$ is placed between the lens $L_3$ and the field of view diaphragm and the lenses $L_2$ and $L_3$ may move in the same direction as indicated by the broken line positions $L_2'$ and $L_3'$.

In the embodiment shown in Fig. 5 the elements are the same as in the embodiment of Fig. 2, lens $L_3$ being omitted, and the telesystem comprising the lenses $L_4$ and $L_5$ are slidable with the field of view diaphragm 4 as a unit as indicated by the broken line positions $L_4'$; $L_5'$ and $4'$. The image $2a$ shifts by shifting the lens $L_2$ as indicated at $2a'$.

The effect of the shifting of these various elements is shown in Tables 1 to 5 below, corresponding to Figs. 1 to 5 respectively, and, in order to show more clearly the relations of the distances in the tables they are indicated with the same reference characters in the drawings as follows:

$e$ is the variable distance between the attachment plane 6 of the microscope tube and the phase plate 8.

$d_0$ is the distance from the collector lens 2 to the annular aperture of the angular aperture diaphragm 3.

$d_1$ is the variable distance between the diaphragm 3 and slidable lens $L_2$.

$d_2$ is the variable distance between the lens $L_3$ and the diaphragm 3.

$d_3$ is the distance of the field of view diaphragm 4 from the diaphragm 3.

$d_4$ is the distance of the negative lens $L_4$ from the diaphragm 3.

$d_5$ is the distance of the lens $L_5$ from the diaphragm 3.

$d_6$ is the distance of the objective attachment plane 6 from the aperture 3. Because of the bending of the beam at the beam splitter the plane 6 is shown as a broken line $6'$ displaced from the position actually of the line 6.

With $d_1'$; $d_2'$; $d_3'$; $d_4'$; $d_5'$; are designated the distances in shifted positions of the respective elements.

In the tables and in Figs. 2–5 D is the distance of the image $2a$ of the collector lens 2 from the field of view diaphragm 4.

V, not indicated in the drawings, is the variable magnification with which the diaphragm 3 is projected on the phase plate 8.

$f_h$, not shown in the drawings, is the focal length of the lenses, $h$ being 1, 2, 3. . . .

Table 1 illustrates the values of $e$ and V for three positions of the lens $L_2$ in the embodiment of Fig. 1, that is, for three values of the distance $d_1$, taking the focal length of the lens $L_1$ as $f_1=-40$ mm., of the lens $L_2$ as $f_2=+16$ and of the lens $L_5$ as $f_5=+40$.

*Table 1 (corresponding to Fig. 1)*

| | | | |
|---|---|---|---|
| $d_1$ | 0 | 8.0 | 16.0 |
| $e$ | 40 | 35 | 0 |
| V | 1 | 1.7 | 2.5 |

In the embodiment shown in Fig. 2, the image $2a$ of the collector lens 2 is projected by the lens $L_2$ to a position near the field of view diaphragm 4, its distance from the field of view diaphragm being designated D. The annular aperture of diaphragm 3 is imaged through the lenses $L_2$; $L_4$ and $L_5$ on the phase plate 8 of the objective which for various objectives has various distances $e$ from the attachment plane 6.

The annular aperture is imaged with a variable magnification by shifting the lens $L_2$. The range of shifting of the lens $L_2$ is indicated through the full line and broken line positions of the lens $L_2$. Thus lens $L_2$ can have the distances of the range between $d_1$ and $d_1'$. The formation of the system $L_4$ to $L_5$ as a telesystem enables the lens $L_2$ to be shifted beyond its focal length so that the range of distances $e$ and the range of magnifications V of the image of the aperture 3 is greater than in the embodiment of Fig. 1.

In the example given in the following Table 2, the focal lengths of the lenses $L_1$ to $L_5$ are as follows: $f_1=-35.2$ mm., $f_2=+20.0$ mm., $f_4=-10.0$ mm., $f_5=+17.4$ mm., and the distances are as follows: $d_0=150$ mm., $d_3=57.5$ mm., $d_4=59.5$ mm., $d_5=75.25$ mm. and $d_6=113.25$ mm. Then D, $e$ and V for various values of $d_1$ are:

*Table 2 (corresponding to Fig. 2)*

| $d_1$ | D | $e$ | V |
|---|---|---|---|
| Mm. | Mm. | Mm. | |
| 1.5 | +4.0 | 23.5 | 0.38 |
| 6.5 | −4.3 | 23.1 | 0.52 |
| 11.5 | −6.0 | 21.9 | 0.69 |
| 16.5 | −5.0 | 19.1 | 0.91 |
| 21.5 | −2.7 | 14.1 | 1.06 |
| 26.5 | +0.4 | 7.2 | 1.28 |
| 31.5 | +4.0 | 0.7 | 1.27 |

From Table 2 it is evident that, by varying the distance $d_1$ from 1.5 mm. to 31.5 mm., the distance $e$ of the image of the annular aperture from the attachment plane 6 varies from 23.5 mm. to 0.7 mm. and, at the same time, the magnification of its image varies from 0.38 to 1.27. However, the illumination of the field of view is not perfect because the distance D is not perfectly constant.

Table 3 corresponds with Fig. 3 in which two lenses $L_2$ and $L_3$ are arranged in the space between the diaphragms 3 and 4 to slide in reverse directions at different rates. As is apparent from Table 3, the variation of D is very small. In this embodiment, the focal lengths of the lenses $L_1$ to $L_5$ are, respectively: $f_1=-141.1$ mm.; $f_2=+35.0$ mm.; $f_3=+25.0$ mm.; $f_4=-8.0$ mm. and $f_5=+19.16$ mm. The distances are $d_0=135$ mm.; $d_3=71.0$ mm.; $d_4=73.0$ mm.; $d_5=90.56$ mm., and $d_6=128.56$ mm. The values D, $e$ and V as functions of $d_1$ and $d_2$ are:

*Table 3 (corresponding to Fig. 3)*

| $d_1$ | $d_2$ | D | e | V |
|---|---|---|---|---|
| Mm. | Mm. | Mm. | Mm. | |
| 3.0 | 67.7 | −0.30 | 22.6 | 0.42 |
| 6.0 | 66.61 | −0.12 | 22.2 | 0.48 |
| 9.0 | 65.52 | +0.039 | 21.6 | 0.55 |
| 12.0 | 64.43 | +0.16 | 20.7 | 0.62 |
| 15.0 | 63.34 | +0.29 | 19.4 | 0.71 |
| 18.0 | 62.25 | +0.35 | 17.5 | 0.80 |
| 21.0 | 61.16 | +0.32 | 15.0 | 0.91 |
| 24.0 | 60.07 | +0.20 | 11.5 | 1.03 |
| 27.0 | 58.98 | −0.01 | 6.6 | 1.17 |
| 30.0 | 57.90 | −0.30 | 0.0 | 1.33 |

Table 4 corresponds with Fig. 4 in which the negative lens $L_4$ is positioned in the space between the diaphragms 3 and 4 and two positive lenses $L_2$ and $L_3$ are slidable in the same direction to various extents. In this table the focal lengths of the lenses $L_1$ to $L_5$ are respectively $f_1 = -13.3$ mm.; $f_2 = +15.0$ mm.; $f_3 = +42.54$ mm.; $f_4 = -10.0$ mm. and $f_5 = +19.3$ mm. The fixed distances are respectively $d_0 = 154.0$ mm.; $d_3 = 42.0$ mm.; $d_4 = 41.0$ mm.; $d_5 = 61.3$ mm. and $d_6 = 99.3$ mm. The values of D, e and V as functions of $d_1$ and $d_2$ are:

*Table 4 (corresponding with Fig. 4)*

| $d_1$ | $d_2$ | D | e | V |
|---|---|---|---|---|
| Mm. | Mm. | Mm. | Mm. | |
| 3.0 | 6.0 | +2.9 | 21.7 | 0.55 |
| 6.0 | 13.0 | −3.6 | 20.3 | 0.81 |
| 9.0 | 20.0 | −3.5 | 16.9 | 1.13 |
| 12.0 | 27.0 | −2.3 | 11.4 | 1.43 |
| 15.0 | 34.0 | −0.2 | 5.5 | 1.57 |
| 18.0 | 41.0 | +3.0 | 1.3 | 1.54 |

Table 5 corresponds with Fig. 5 in which the lens $L_2$ is slidable between the diaphragms 3 and 4 and the telesystem $L_4$—$L_5$ is slidable as a unit with the field of view diaphragm 4. The variation of D is very small. The focal lengths of the lenses are as follows: $f_1 = -52.8$ mm.; $f_2 = +20.0$ mm.; $f_4 = -10.0$ mm.; $f_5 = +19.2$ mm. The fixed distances are: $d_0 = 157.0$ mm. and $d_6 = 115.83$ mm. The values of D, e and V as functions of $d_1$, $d_3$, $d_4$ and $d_5$ are:

*Table 5 (corresponding with Fig. 5)*

| $d_1$ | $d_3$ | $d_4$ | $d_5$ | D | e | V |
|---|---|---|---|---|---|---|
| Mm. | Mm. | Mm. | Mm. | Mm. | Mm. | |
| 1.5 | 39.5 | 41.5 | 59.03 | +1.05 | 19.4 | 0.61 |
| 6.5 | 42.63 | 44.63 | 62.16 | −0.75 | 17.8 | 0.72 |
| 11.5 | 45.77 | 47.77 | 65.30 | −1.36 | 15.1 | 0.84 |
| 16.5 | 48.90 | 50.90 | 68.43 | −1.28 | 10.8 | 1.01 |
| 21.5 | 52.03 | 54.03 | 71.56 | −0.76 | 4.6 | 1.17 |
| 26.5 | 55.17 | 57.17 | 74.70 | +0.04 | −3.8 | 1.41 |
| 31.5 | 58.30 | 60.30 | 77.83 | +1.04 | −13.8 | 1.55 |

As shown by way of example in the above tables, the apparatus of my invention enables the distance e of the annular aperture image from the objective attaching plane 6 of the microscope tube to be increased over a substantial range whereby the magnification V decreases.

Having described my invention, what I claim is:

1. Apparatus for Koehler illumination of phase contrast top light microscopes with a series of different objectives, each objective containing a phase plate in the exit pupil of the optical system comprising the microscope objective, the reflecting surface of the specimen and an illuminating lens system, the exit pupil and phase plate of each objective being at a different vertical position from that of the others; comprising an angular aperture diaphragm to be projected at said phase-plates; an object plane; a field of view diaphragm to be projected at said object plane a negative lens near the aperture diaphragm and a negative lens near the field of view diaphragm; a lamp; and a lens system consisting of a collector lens to condense light from said lamp to said angular aperture, a magnifying lens slidable between said two diaphragms and a lens between said field of view diaphragm and said objective projecting the said field of view diaphragm at said object plane and the image of said angular aperture formed by said magnifying lens at the phase plate of the objective.

2. Apparatus of claim 1 comprising a negative lens next said angular aperture diaphragm.

3. Apparatus of claim 2 having a negative lens placed near the field of view diaphragm which forms a reverse telesystem with the lens imaging the field of view.

4. Apparatus of claim 3 having two slidable positive lenses between the aperture diaphragm and the field of view diaphragm.

5. Apparatus of claim 2 in which the field of view diaphragm is movable along its optical axis and having a negative lens at the exit side of the field of view diaphragm and movable as a unit therewith.

6. Apparatus for Koehler illumination of phase contrast, top light, microscopes comprising a series of different objectives each having a phase plate placed in the exit pupil of the illumination system, each phase plate being at a different vertical position from the others, an angular aperture diaphragm having an annular aperture, a field of view diaphragm, a lens rearwardly of said field of view diaphragm, a microscope tube carrying said objectives and phase plates and having a beam splitter to reflect a light beam downwardly through said objective placed in the path of said beam, a mounting platform below said tube to mount a specimen in the path of a light beam from said beam splitter to reflect said light back through one of said objectives and through said beam splitter and a lens slidable in the path of the beam between the angular aperture diaphragm and the field of view diaphragm.

7. Illuminating apparatus of claim 6 having a second lens slidable along the light beam between said aperture diaphragm and said field of view diaphragm in series with said first slidable diaphragm.

8. Illuminating apparatus of claim 7 in which said slidable lenses are slidable at non-linear rates.

9. Illuminating apparatus of claim 7 in which said slidable lenses slide in opposite directions.

10. Apparatus of claim 7 having a negative lens in advance of said field of view diaphragm.

11. The apparatus of claim 7 in which said field of view diaphragm is slidable along the path of a light beam therethrough and having a negative lens and a positive lens in series to the rear of said field of view diaphragm and slidable as a unit therewith.

12. Apparatus for Koehler illumination for phase contrast, top light, microscopes with a series of objectives which comprises a lamp, an angular aperture diaphragm with an annular aperture, a field of view diaphragm spaced 57 mm. to the rear of said aperture diaphragm, a condenser lens positioned 150 mm. in advance of said aperture diaphragm, a negative lens having a plane face at the front face of said aperture diaphragm and having a focal length equal to −35 mm., a lens slidable on its optical axis between said diaphragms and having a focal length of +20 mm., a negative lens having a focal length of −10 mm. spaced 59 mm. to the rear of said aperture diaphragm, a lens having a focal length of 17 mm. spaced 75 mm. to the rear of said aperture diaphragm, a microscope tube having a beam splitter and an objective mounting plane below said beam splitter and at a distance from the aperture diaphragm along the path of the light beam equal to 113 mm.

13. Apparatus for Koehler illumination for phase contrast, top light, microscopes with a series of objectives which comprises a lamp, a microscope tube having a light beam splitter and an objective mounting plane below said beam splitter, an angular aperture diaphragm having an annular aperture for the passage of a light beam to said beam splitter, an inlet condenser lens spaced 135 mm. from the entrance face of said aperture diaphragm, a negative lens at the entrance face of said aperture diaphragm having a focal length of −141 mm., a field of view diaphragm between said aperture diaphragm and said beam splitter and spaced 71 mm. from the aperture diaphragm, a first slidable lens having a focal length of +35 mm. slidable between the aperture diaphragm and the field of view diaphragm, a second lens slidable between said first lens and said field of view diaphragm and having a focal length of +25 mm., a second negative lens of focal length of −8 mm. between said field of view diaphragm and said beam splitter and spaced 73 mm. from the aperture diaphragm and a final lens of a focal length of +19 mm. between said second negative lens and said beam splitter and spaced 90 mm. from said aperture diaphragm, the distance of the attachment plane of said tube along the path of said light beam from said aperture diaphragm being 128 mm.

14. Apparatus for Koehler illumination as in claim 13 in which the distance of the angular aperture diaphragm from the inlet condenser lens is 154 mm., the focal length of the negative lens is −13 mm., the distance between the angular aperture diaphragm and the field of view diaphragm is 42 mm., the focal length of the first slidable lens is +15 mm., the focal length of the second slidable lens is +42 mm., the focal length of the second negative lens is −10 mm. and its distance from the aperture diaphragm is 41 mm., a final lens of focal length of +19, spaced 61 mm. from said aperture diaphragm and the distance along the path of the light beam from the aperture diaphragm to the objective attachment plane of the tube is 99 mm.

15. Apparatus for Koehler illumination of claim 11 for phase contrast, top light, microscopes which comprises a microscope tube having a light beam splitter and an objective mounting plane below said beam splitter, an angular aperture diaphragm having an annular aperture for the passage of light to said beam splitter, an inlet condenser lens spaced 157 mm. in front of the inlet side of said angular aperture diaphragm, a field of view diaphragm between said angular aperture diaphragm and said beam splitter, a negative lens at the inlet side of the angular aperture diaphragm having a focal length of −52 mm., a lens of a focal length of +20 mm. slidable on its optical axis in the path of the light beam between the aperture diaphragm and the field of view diaphragm, a second negative lens of focal length of −10 mm. between the field of view diaphragm and the beam splitter and a final lens of a focal length of +19 mm. between the field of view diaphragm and the beam splitter, the distance from the angular aperture diaphragm along the path of the light beam to the objective mounting plane being 115 mm., and the said second negative lens, the final lens and the field of view diaphragm being shiftable as a unit.

16. The apparatus of claim 1 in which the exit pupil through the lens system is placed in the back focal plane of the microscope objective to permit the objective to be used as well for bottom light as for top light.

References Cited in the file of this patent

UNITED STATES PATENTS

| | | |
|---|---|---|
| 2,078,586 | Richter | Apr. 27, 1937 |
| 2,553,108 | Osterberg et al. | May 15, 1951 |
| 2,675,737 | Bennett | Apr. 20, 1954 |
| 2,766,655 | Pinkowski | Oct. 16, 1956 |

FOREIGN PATENTS

| | | |
|---|---|---|
| 257,153 | Switzerland | Mar. 16, 1949 |

OTHER REFERENCES

Journal of the Optical Society of America, vol. 38, No. 4, April 1948, Phase Microscopy with Vertical Illumination, pages 338 to 342.

Phase Microscopy, by Alva H. Bennett, Helen Jupnik, Harold Osterberg, and Oscar Richards, Copyright 1951 by John Wiley & Sons, Inc., New York: The Phase Vertical-Illumination Microscope, pages 145–150.